Patented Dec. 11, 1934

1,983,888

UNITED STATES PATENT OFFICE 1,983,888

NEW INDIGOID VAT DYESTUFFS

Werner Zerweck and Wilhelm Hechtenberg, Frankfort - on - the - Main - Fechenheim, Germany, assignors to General Aniline Works, Inc., New York, N. Y., a corporation of Delaware No Drawing. Application July 22, 1931, Serial No. 552,555. In Germany August 1, 1930

3 Claims. (Cl. 260—49)

Our present invention relates to new indigoid vat dyestuffs corresponding to the general formula:

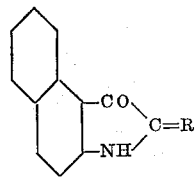

wherein the naphthalene nucleus contains an alkoxy group and R means an indigoid dyestuff component.

Of a special value are those of these dyestuffs which contain as second component (R in the above formula) the residue of a naphthoxythiophene which may contain a methoxy group. They correspond to the general formula:

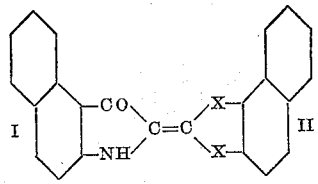

(wherein the nucleus signified by I contains an alkoxy radical, that signified by II may contain a methoxy group and one X means CO the other X means S).

The dyestuffs yield brown to olive brown dyeings distinguished by intensity and a good fastness. The dyestuffs being object of our present invention may be prepared in the following manner:

An alkoxy-2-amino-naphthalene is converted according to Sandmeyer's method into alkoxy-2.1-naphthisatine. This compound is condensed with an indigoid dyestuff component, especially with a naphth-oxy-thiophene or a nuclear methoxy derivative. Also the alkoxy-2.1-naphthisatine may first be converted into a corresponding α-chloride or anil and then condensed with the indigoid dyestuff component.

In order to further illustrate our invention the following examples are given, the parts being by weight and all temperatures in centigrade degrees. But we wish it to be understood that we are not limited to the particular conditions nor specific products mentioned therein.

Example 1

22.6 parts of 6-methoxy-2.1-naphthisatine (representing when recrystallized from glacial acetic acid dark reddish brown crystals melting at 292°) are heated in chlorobenzene with 26 parts of phosphorus pentachloride. The solution of the α-chloride thus formed is introduced into a solution of 20 parts of 2.1-naphth-oxy-thiophene in chlorobenzene. After heating for some time the mixture is cooled, the formed dyestuff is filtered and washed with chlorobenzene. It represents when dry a black powder, soluble in concentrated sulfuric acid with a blue tint, dyeing cotton from a yellow vat olive green shades. It corresponds to the formula:

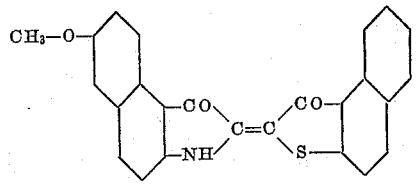

A similar dyestuff is obtained by using instead of 6-methoxy-2.1-naphthisatine the corresponding ethoxy compound.

In the following table there are shown the shades obtained on cotton by means of some other dyestuffs of this series:

6-methoxy-2.1-naphthisatine+
    1.2-naphthoxy-thiophene=greenish olive 6-methoxy-2.1-naphthisatine+
    6-methoxy-1.2-naphth-oxy-thiophene=
                                 bright olive green 7-methoxy-2.1-naphthisatine+
    1.2-naphth-oxy-thiophene=violettish brown
    (yellowish brown needles melting at 280°)

7-methoxy-2.1-naphthisatine+
    6-methoxy-1.2-naphth-oxy-thiophene=
                                 reddish brown
    (yellowish brown needles melting at 280°)

3-methoxy-2.1-naphthisatine+
    6-methoxy-1.2-naphth-oxy-thiophene=
                                   olive brown
    (orange red crystals melting at 280°)

We claim:
1. The indigoid vat dyestuffs corresponding to the general formula:

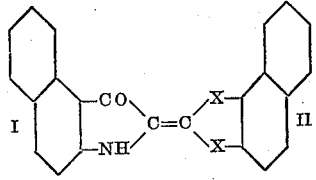

(wherein the nucleus signified by I contains an alkoxy radical, that signified by II may contain in 6-position a methoxy group and one X means CO the other X means S) which compounds dye vegetable fibers brown to olive brown shades.

2. The indigoid vat dyestuff corresponding to the formula:

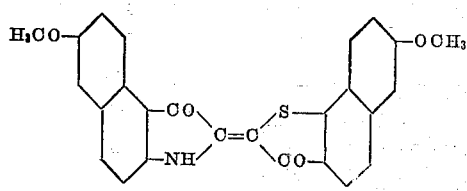

which compound dyes vegetable fibers bright olive green shades.

3. The indigoid vat dyestuff corresponding to the formula:

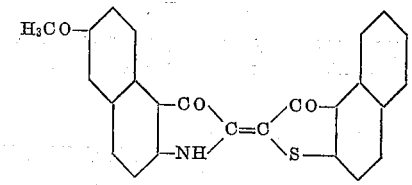

which dyes vegetable fibers olive green shades.

WERNER ZERWECK.
WILHELM HECHTENBERG.